US007200551B1

(12) United States Patent
Senez

(10) Patent No.: US 7,200,551 B1
(45) Date of Patent: Apr. 3, 2007

(54) AUTOMATED BILL PAYMENT SYSTEM

(75) Inventor: Raymond Senez, Winnipeg (CA)

(73) Assignee: TelPay, Inc., Winnipeg (CA)

( * ) Notice: Subject to any disclaimer, the term of this patent is extended or adjusted under 35 U.S.C. 154(b) by 0 days.

(21) Appl. No.: 09/514,271

(22) Filed: Feb. 28, 2000

(51) Int. Cl.
*G06Q 40/00* (2006.01)

(52) U.S. Cl. .............................. 704/40; 705/35; 705/39
(58) Field of Classification Search ................ 705/40, 705/39, 35
See application file for complete search history.

(56) References Cited

U.S. PATENT DOCUMENTS

| 5,326,959 | A | * | 7/1994 | Perazza ...................... 235/379 |
| 5,383,113 | A | | 1/1995 | Kight et al. ................ 364/401 |
| 5,465,206 | A | * | 11/1995 | Hilt et al. ..................... 705/40 |
| 5,699,528 | A | | 12/1997 | Hogan ........................ 395/240 |
| 5,960,411 | A | | 9/1999 | Hartman et al. .............. 705/26 |
| 5,978,768 | A | | 11/1999 | McGovern et al. ............ 705/1 |
| 6,032,133 | A | * | 2/2000 | Hilt et al. ..................... 705/40 |
| 6,070,150 | A | * | 5/2000 | Remington et al. ........... 705/34 |
| 6,173,272 | B1 | * | 1/2001 | Thomas et al. ............. 707/100 |
| 6,289,322 | B1 | * | 9/2001 | Kitchen et al. ............... 705/40 |
| 6,292,789 | B1 | * | 9/2001 | Schutzer ...................... 705/40 |
| 6,304,857 | B1 | * | 10/2001 | Heindel et al. ............... 705/34 |
| 6,385,595 | B1 | * | 5/2002 | Kolling et al. ................ 705/40 |
| 6,411,940 | B1 | * | 6/2002 | Egendorf ..................... 705/40 |

OTHER PUBLICATIONS www.checkfree.com, "About CheckFree—News: CheckFree and Virginia Power Launch Electronic Bill and Payment Option". (as of Feb. 23, 2000).
www.epost.ca/guided/english/choosepayment.html, "Why should I use it?", epost-electronic post office. (as of Feb. 22, 2000).
www.paymybills.com, "Paymybills—How the Service Works", (as of Feb. 22, 2000).

* cited by examiner

*Primary Examiner*—Jagdish N Patel
(74) *Attorney, Agent, or Firm*—Morgan, Lewis & Bockius LLP

(57) ABSTRACT

The present invention provides a fully automated and secure bill payment system which is extremely simple for clients to operate. A processing web site is established which interconnects via the Internet to a plurality of financial institutions, billers and clients. Each biller has an established web site into which a client of the biller can enter and view a bill image using a personal computer or similar device connected to the Internet. The bill image is actually part of a HTML form which contains hidden identifying information of the biller. To facilitate payment, the client selects a bill payment icon presented graphically within the body of the bill image. This action initiates a sequence of events, including the forwarding of the HTML form to the processing web site, a confirmation message being sent to the client, confirmation by the client, and the debiting and crediting of client and biller accounts respectively. Instead of requiring the client to log into the biller's web site, the bill can also be presented to the client by way of an e-mail message. Similar to the previous scenario, bill payment is accomplished by the client selecting a bill payment icon.

26 Claims, 5 Drawing Sheets pangea.ca bill

```
From accounts@pangea.ca Fri Sep 10 19:10:53 1999
             Date: 10-Sep-1999
          From: Pangea Accounting
          To: finnegan@mail.pangea.ca
          Cc: bills@pangea.ca
          Subject: Invoice #6867647

Account: test                    Invoice date : 1999-09-03
------------------------------------------------------------
                    INVOICE #6867647
------------------------------------------------------------
              Account charges:
  Date        Description
 1999-09-03    ADMINS       SEP      Amount    PST  GST
                                     20.00
                                    --------
                    Total misc.       0.00
                                    --------

User id: test
 1999-08-04 19:36:13 EVENING     0.198 Hr.     0.00
 1999-08-06 22:48:23 EVENING     0.004 Hr.     0.00
 1999-08-06 22:50:52 EVENING     0.003 Hr.     0.00
 1999-08-06 22:52:17 EVENING     0.001 Hr.     0.00
 1999-08-06 22:56:25 EVENING     0.001 Hr.     0.00
 1999-08-06 22:57:56 EVENING     0.001 Hr.     0.00
 1999-08-09 12:56:06 DAYTIME     0.134 Hr.     0.00
 1999-08-09 21:27:25 EVENING     0.001 Hr.     0.00
 1999-08-09 21:27:44 EVENING     0.001 Hr.     0.00

Date       Time   Description               Amount
                     test cont'd
 1999-08-09 21:30:17 EVENING     0.001 Hr.     0.00
 1999-08-10 14:14:06 DAYTIME     0.016 Hr.     0.00
                                              --------
    0.360 Hr.          Total for test          0.00
                                              --------

User id: test
 1999-09-03         UNIX SHELL   SEP           0.00
                                              --------
    0.000 Hr.          Total for test          0.00
                                              --------

--------
                    0.360 Hrs.
                      Net          $    20.00
                      PST               1.40
                      GST#887698515     1.40
                                      --------
  TOTAL Invoice #6867647                22.80
                                      ========
```

Enter the amount of your payment [22.80] — 22

[PAYIT] — 24

FIGURE 2

```html
<HTML>
<HEAD>
    <TITLE>Pay By TelPay Telpay Demonstration - The Bay</TITLE>
</HEAD>
<!- The following program can be used free of charge for the purpose of allowing invoices/bills or
statements that are presented on the internet, to be linked to an internet payment processor, providing the
following restriction is applied. CTI Comtel requires that the Copyright notice not be removed, and that the
link and form associated with the Pay By TelPay web site be maintained as a valid and active link which is
clearly visible in close proximity to the amount due field of any presented invoice/bill or statement. ->

<center>
<!- Sample Logo from biller ->
<IMG SRC="http://www.hbc.com/bay/images/bay_logoc.gif"><BR>
<br>
Place your statement/bill/invoice information here          20

<!-Link / Form to connect to TelPay Do Not Remove ->
        <form action="https://secure.telpay.ca/cgi-bin/telpay" method="post">
        <!- Constant ->
                <input TYPE=HIDDEN name="SCREENID" value="100">
        <!- Assigned by TelPay one Vendor Id per Biller ->
                <input TYPE=HIDDEN name="VENDORID" value="24">
        <!- Biller Invoice/Reference # ->
                <input TYPE=HIDDEN name="VENDORSEQ" value="12345">
        <!- Customers account number with this Biller ->
                <input TYPE=HIDDEN name="PAYEEACCOUNT" value="3325967829">

<p>
        <!- Amount due field ->
                <p>Your account balance is <input TYPE=Input name="PAYAMOUNT" value="1.00">
        <!- Link to Pay By TelPay This link must remain in close proximity to the amount due field on the
        statement/bill or invoice ->
        <input type="image" name="PAYIT" ALLIGN=BOTTOM
        SRC="https://secure.telpay.ca/paybytelpay.jpg">
        </P>
</form>

<BR><BR><BR><BR>
Copyright 1999,2000 CTI Comtel Inc.
</HTML>
```

FIGURE 3

You wish to pay PANGEA.CA INC account TEST
The amount of $22.80

28 — Enter your PIN Number ▢ — 26
then click [Yes] to process this or [No] to cancel.

For assistance please contact TelPay at 1-800-665-0302.

FIGURE 4

AUTOMATED BILL PAYMENT SYSTEM

BACKGROUND TO THE INVENTION

1. Field of Invention

This invention relates generally to a financial transaction system and method, and more particularly to a computerized bill payment system for use in a wire or wireless network which requires a minimal amount of user interaction to affect bill payment.

2. Description of the Related Prior Art

In its crudest form, the bill payment transaction cycle includes the following steps: (a) generation of a bill by a biller; (b) mailing the bill to the client; (c) client writing a cheque for the invoiced amount and mailing the cheque along with a remittance slip to the biller; (d) biller manually depositing cheque in their bank account; (e) when cheque clears (i.e. physically sending the cheque to the client's bank and sufficient funds in client's bank account being identified and debited), biller crediting client's account. The process described above is paper intensive and administratively burdensome, not to mention the fact it often required to be done for multiple billers at least monthly. In addition, the client must absorb the cost of the postage for mailing the cheques. Paper cheque processing also entails significant costs to the payees who receive and handle the client's cheques.

It will be understood by those in the art, that there have been attempts to semi-automate the bill payment transaction cycle. As a service to client's, some banks have made arrangements with designated payees to accept payment of invoices received in the mail by bank clients directly through the bank. A client can bring their mailed bill to the bank and have a teller process the bill by debiting the clients account and processing a credit to the biller which may be deposited in a biller's account with the bank or electronically transferred to an account in another bank used by the biller. The electronic transfer typically takes place over a data network interconnecting the two financial institutions. The remittance slip received from the client is then mailed to the biller, so that it can be reconciled with the mailed invoice. Alternately, the client can use an automated teller machine (ATM™) to deposit the remittance slip associated with the bill, and dictate the account from which the billed amount is to be debited with the remainder of the steps in the bill payment transaction being as described above. Any ATM™ of the client's bank can be used to facilitate payment, allowing the client to choose the most geographically convenient location to initiate the bill payment. However, regardless of the ATM chosen, the client must physically travel to the ATM to make payment. Further, the mailing of a hard copy of the bill is not avoided, nor is the handling of a remittance slip by the bank. Additionally, the service is restricted to client's of a particular financial institution offering such a bill payment service.

The prior art is replete with attempts to fully automate the bill payment transaction cycle. In U.S. Pat. No. 5,383,113 issued on Jan. 17, 1995 and owned by Checkfree Corporation, for example, there is disclosed a computerized payment system through which a consumer may instruct a server by telephone, computer terminal or other telecommunications device to pay bills without having to write a cheque. In this system, a bill is received from a merchant in hard copy form and the consumer is able to make payment to the merchant through a centralized server resident on a network. The payment system allows a consumer to establish a list of merchants to be paid, along with details regarding the financial institution from which funds are to be drawn for payment. To affect payment, a consumer simply contacts the server and enters payment instructions. Debiting and crediting of payments from financial institutions and merchants respectively is then facilitated by electronic funds transfer or paper cheque. In this system, bill information is not uploaded to the server. The server simply has a merchant list and associated user account information from which it coordinates payment. This automated clearing house model for bill payment provides a universal bill payment system that works regardless of the consumer's financial institution. However, it does not completely eliminate the generation of hard copies of bills from merchants or the processing of paper cheques for merchant payment. Further, in order to facilitate payment, the consumer must navigate through lengthy menus, making appropriate entries in the process.

U.S. Pat. No. 5,699,528 issued on Dec. 16, 1997 and owned by MasterCard International Inc., offers another example of an automated bill payment system. In this patent there is disclosed a bill delivery and payment system which allows users to access a server via the Internet to facilitate bill payment. Using a personal computer, a user can view bill information and instruct the server regarding payment instructions. Bill information is uploaded from billers to the server for display to users. After a user has entered payment information the users bank account is debited and the biller is credited automatically.

In an alternate embodiment, without visiting the server, users are provided with electronic bills containing bill information via e-mail from the server. Users are able to facilitate payment by responding to the e-mail with payment instructions. In order to manipulate and respond to electronic bills, users are required to install software in the form of a bill payment program on their home computer. The software provides menus which allow the user to view and/or pay bills, view confirmation of bill payments or view administrative messages. The program can also prompt the user that there are unopened or unpaid bills.

Although this system works adequately, it has several drawbacks. In hard copy form, billers often include advertisements as a revenue generation scheme. In the above system, whether bills are presented to a user on the server or the bills are e-mailed, the advertisements and with it the potential for increased revenue. Further, bill information is uploaded to the server which serves to create a security risk which includes making confidential client information available to a third party. In addition, there are increased operational costs associated with database maintenance and the necessary updating which is required to pass payment information to and from the server. Finally, the user is required to install and navigate through the systems proprietary software to facilitate payment, a cumbersome process involving multiple steps.

Accordingly, there is a need for a bill payment system which: (a) is fully automated; (b) requires minimal user interaction to facilitate bill payment; (c) is secure, requiring minimal transmission of confidential user account or personal information, and (d) allows billers to market additional services.

SUMMARY OF THE INVENTION

The present invention serves to overcome the deficiencies of the prior art by providing a fully automated and secure bill payment system which is extremely simple for clients to operate and which allows the biller's the opportunity to use the billing process as a marketing tool. A processing web site is established which interconnects via the Internet to a plurality of financial institutions and billers. Each biller has an established web site into which a client of the biller can enter and view a bill image using a personal computer or similar device connected to the Internet. The bill image is actually part of a HTML form which contains hidden identifying information of the biller. To facilitate payment, the client selects a bill payment icon presented graphically within the body of the bill image. This action initiates a sequence of events, including the forwarding the HTML form to the processing web site, a confirmation message being sent to the client, confirmation by the client, and the debiting and crediting of client and biller accounts respectively. Instead of requiring the client to log into the biller's web site, the bill can also be presented to the client by way of an e-mail message. Similar to the previous scenario, bill payment is accomplished by the client selecting a bill payment icon. In both scenarios, the biller is able to provide marketing materials to the client by embedding messages or hypertext links in the electronic bill.

In accordance with one aspect of the present invention there is provided a system for the automated payment of bills comprising: a bill processing server connected to a network, one or more financial institution servers connected to the network, wherein a client has at least one banking account associated with at least one of the one or more financial institution servers and a biller has at least one banking account associated with at least one of the one or more financial institution servers; one or more biller servers connected to the network, wherein the client has at least one billing account associated with at least one of said one or more biller servers; at least one client computer connected to the network; wherein the one or more biller servers includes means to format bill information and bill payment instructions associated with the at least one billing account; and wherein the bill information further includes means for initiating bill payment instructions; and wherein the at least one client computer comprises a processor, communication means, a server access program and a display for receiving and viewing from the one or more biller servers the bill information, and input means for selecting the means for initiating bill payment instructions; and wherein the processor integral to the at least one client computer is responsive to the input means and causes the communication means to communicate the bill payment instructions to the bill processing server when the means for initiating bill payment instructions is selected; and wherein the bill processing server causes a selected one of the at least one client banking account to be debited and a selected one of the at least one biller banking account to be credited, upon receipt of the bill payment instructions; and wherein the bill processing server reports to a selected one of the one or more biller servers a selected one of the at least one billing account associated with the biller and a credit amount; and wherein the bill processing server reports to a selected one of the at least one client computer a selected one of the at least one billing account associated with the client and a debit amount.

In accordance with a second aspect of the present invention there is provided a method of viewing and paying bills over a communications network, the communications network comprising: a bill processing server connected to a network, one or more financial institution servers connected to the network, wherein a client has at least one banking account associated with at least one of the one or more financial institution servers and a biller has at least one banking account associated with at least one of the one or more financial institution servers; one or more biller servers connected to the network, wherein the client has at least one billing account associated with at least one of the one or more biller servers; and at least one client computer connected to the network, the method comprising the steps of:

(a) formatting bill information and bill payment instructions associated with the at least one billing account, wherein the bill information includes means for initiating bill payment instructions;

(b) transmitting the bill information and the bill payment instructions from a selected one of the one or more biller servers to a selected one of the at least one client computer;

(c) receiving and displaying the bill information on the selected one of the at least one client computer, wherein the selected one of the at least one client computer comprises a processor, communication means, a server access program and a display for receiving and displaying the bill information, and input means for selecting the means for initiating bill payment instructions;

(d) selecting the means for initiating bill payment instructions;

(e) transmitting the bill payment instructions from the selected one of said at least one client computer to the bill processing server;

(f) receiving the bill payment instructions into the bill processing server;

(g) debiting a selected one of the at least one client banking account associated with the (h) crediting a selected one of the at least one biller banking account;

(i) reporting said selected one of said at least one billing account and a credit amount to said selected one of said one or more biller servers; and (j) reporting said selected one of said at least one billing account and a debit amount to said selected one of said at least one client computer.

BRIEF DESCRIPTION OF THE DRAWINGS

A better understanding of the invention will be obtained by reading the description of the invention below, with reference to the following drawings, in which:

FIG. 2 is an example of a bill image presented to a client;

FIG. 3 is the HTML form utilized within the system of the present invention;

FIG. 4 is a confirmation page received by a client from a bill processing server.

DESCRIPTION OF THE PREFERRED EMBODIMENT

Figure 1:
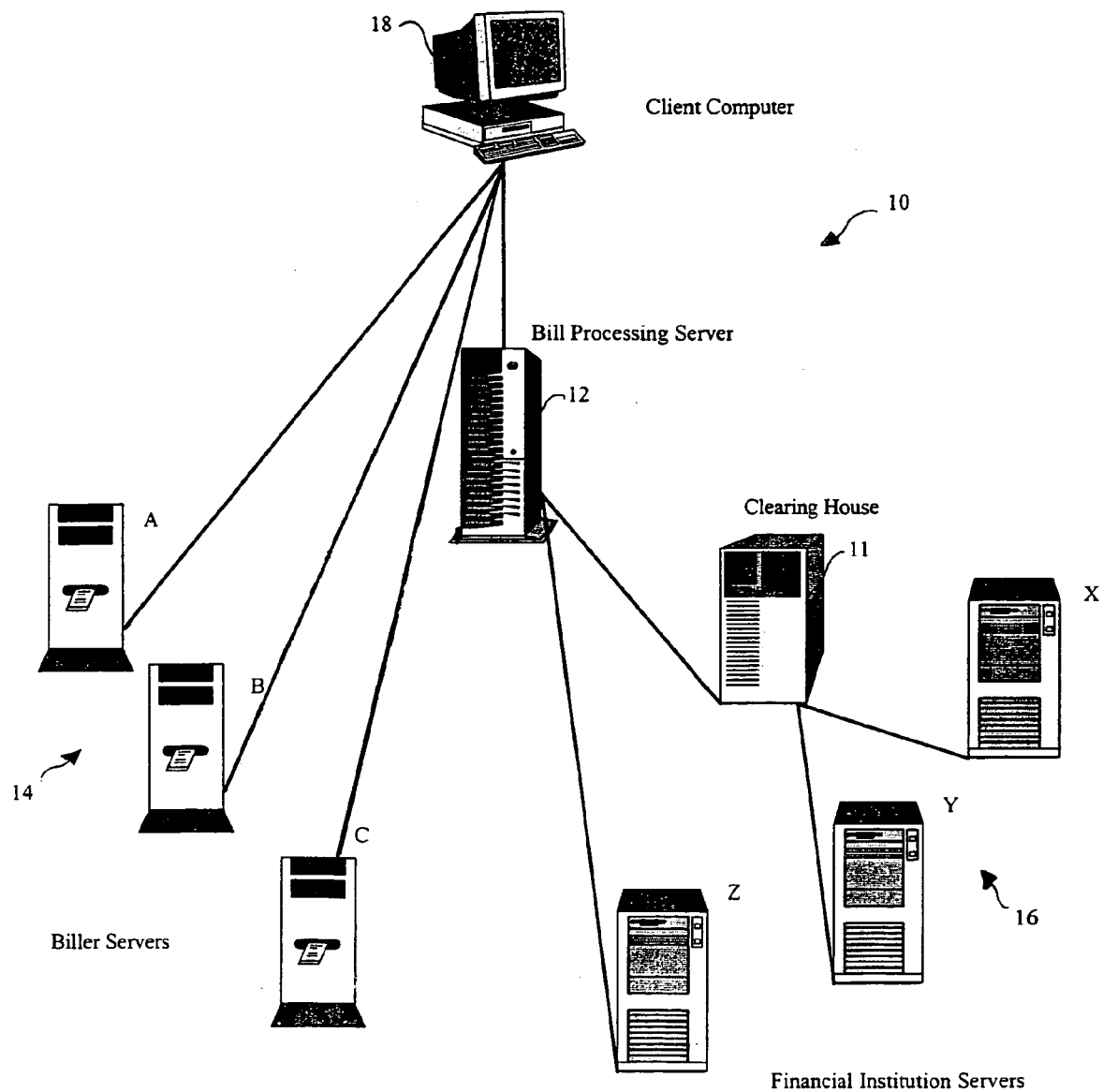
FIG. 1 is a system diagram of the present invention.

Referring to FIG. 1, a network diagram depicting the system of the present invention is presented. A network (generally depicted at 10) interconnects clearing house 11, bill processing server 12, biller servers A, B and C (generally depicted as 14), financial institution servers X, Y and Z (generally depicted as 16) and client computer 18. For the sake of simplicity, the network components (e.g routers, switches, etc.) have not been shown nor has all of the connectivity between the components integral to the system of the present invention (e.g. client computer 18 connects to each biller server).

In the preferred embodiment network 10 is the Internet. The Internet, is a worldwide system of computer networks—a network of networks in which users at any one computer can, if they have permission, get information from any other computer. The Internet is a public, cooperative, and self-sustaining information system accessible to hundreds of millions of people worldwide. Physically, the Internet uses a portion of the total resources of the currently existing public telecommunication networks. Technically, what distinguishes the Internet is its use of a set of protocols called Transmission Control Protocol/Internet Protocol (TCP/IP). Computers connected to the Internet generally use one or all of the following Internet services:

Electronic mail (e-mail)—Permits a user's computer to send and receive mail;

Telnet or remote login—Permits a user's computer to log onto another distant computer, thereby allowing the user to use the distant computer and if the user was there;

FTP or File Transfer Protocol—Allows a user's computer to rapidly retrieve complex files intact from a remote computer and view or save them on their computer;

Internet Relay Chat (IRC)—allows users to exchange messages in text in real time. IRC allows one to one conversations as well as enabling users to talk with many different people simultaneously;

NewsGroups—similar to bulletin board where individuals sharing a common interest can post and download messages; and The World Wide Web (WWW or "the Web)—an interactive hypertext based system for finding resources on the Internet.

One aspect of the system of the present invention preferably operates using the Web. With a communications modem and a browser a client using client computer 18 can permanently or on a dial-up basis access the Internet through an Internet Service Provider (ISP) such as America Online, CompuServe, and Prodigy. ISPs operate servers which are connected to the Internet. A "browser" is a computer program that resides on a computer enabling a user to view web documents. The web browser handles the function of locating and targeting information on the Internet and displaying information provided by a web server. Examples of web browsers include Microsoft Internet Explorer™ and Netscape Navigator™, The foundation on which the Web functions is Hypertext using Hypertext Markup Language (HTML). Hypertext is the organization of information units into connected associations that a user can choose to make. An instance of such an association is called a link or hypertext link. URLs (uniform resource locators) are the unique addresses of documents on the Web. HTML is a standardized language of computer code, embedded in "source" documents behind all Web documents, containing the textual content, images, links to other documents (and possibly other applications such as sound or motion), and formatting instructions for display on a user's screen. Browsers are programmed to interpret HTML for display. HTML often imbeds within it other programming languages and applications such as SGML, XML, Javascript, CGI-script or the like. SHTML refers to secure HTML which denotes messages passing between computers which have been encrypted as will be explained later.

As will be appreciated by those skilled in the art, the term "computer" is a generic term used to describe the main physical components of an information appliance. Such information appliances include, but are not limited to, workstations, laptops, and wireless personal digital assistants (e.g. Apple's Newton™). In general, such information appliances comprise a bus for communicating instructions, a processor coupled to the bus for processing the instructions, random access memory coupled with the bus for storing volatile information and instructions for the processor, read only memory coupled to the bus for storing static information and instructions for the processor, a display device coupled to the bus for displaying information to a user, an alphanumeric input device coupled to the bus for communicating information and command selections to the processor, and a mass storage device for storing information and instructions. The processor may be any of a wide variety of general purpose processors or microprocessors such as the SPARC™ manufactured by Sun MicroSystems or the PENTIUM™ manufactured by Intel Corporation. The display device could be a cathode ray tube (CRT) or touch screen, such as a liquid crystal display touch screen, while the mass storage device could be a hard disk, floppy disk, optical storage device or the like. As will also be understood by those in the art, the term "server" refers to the computer in which a server program runs. A server program is a program that provides services to other computer programs in the same or other computers. Client/server describes the relationship between two computer programs in which one program, the client, makes a service request from another program, the server, which fulfills the request. Although the client/server idea can be used by programs within a single computer, it is a more important idea in a network. In a network, the client/server model provides a convenient way to interconnect programs that are distributed efficiently across different locations. In the client/server programming model, the server program awaits and fulfills requests from client programs in the same or other computers. A given application in a computer may function as a client which requests services from other programs, and a server which grants requests from other programs. With respect to the Web, a web server is the computer program (housed in a computer) that serves requested HTML pages or files. A web client is the requesting program associated with the user. The web browser in a computer is a client that requests HTML files from Web servers. A web browser is a client program that uses the Hypertext Transfer Protocol (HTTP—a set of rules for exchanging files (text, graphic images, sound, video, and other multimedia files) on the Web to make requests of web servers throughout the Internet on behalf of the browser user.

Users of the Web, in particular businesses, can obtain an Internet address and, using a hypertext editor, develop a hypertext document called a "home page", which a client of the business can access to obtain information, purchase products or services or perform administrative functions relating to a client's account. Generally speaking, the home page furnishes information about the business through the use of graphic images, sound, hypertext links, etc.

As will also be understood by those in the art, electronic mail (or e-mail) is the exchange of computer-stored messages by telecommunication. E-mail messages are usually encoded in ASCII text. However, it is also possible to send non-text files, such as graphic images and sound files, as attachments sent in binary streams.

E-mail is one of the protocols included with the TCP/IP suite of protocols. A popular protocol for sending e-mail across the Internet is the Simple Mail Transfer Protocol (SMTP) However, since it is limited in its ability to queue messages at the receiving end, it's usually used with one of two other protocols, Post Office Protocol 3 (POP3) or Interactive Mail Access Protocol (IMAP), that let the user save messages in an Internet server mailbox and download them periodically from the server. In other words, users typically use a program that uses SMTP for sending e-mail and either POP3 or IMAP for receiving messages that have been received for them at their local server. POP3 is a client/server protocol in which e-mail is received and held for a user by their Internet server (or ISP in the case of client computer 18). Periodically, a user or the user's e-mail software checks their mail-box on the server and downloads any mail. With IMAP, a user views their e-mail at the server as though the mail was resident on their client computer. An e-mail message deleted locally is still on the server. E-mail can be kept on and searched at the server. Most current browser software includes an e-mail function. SMTP and POP3 for example are built into the Netscape™ and Microsoft Internet Explorer™ browsers.

A general overview of the present invention can now be provided. In one aspect of the present invention, biller servers 14 each have an associated home page which a client computer 18 can access through their local Internet Service Provider. At the home page of the biller, the client will enter their account number and be immediately provided with information relating to the current billing period. The information is presented in the form of a bill image with account data covering the last invoice period, along with an indication of the amount outstanding against the account. An example of such a bill image is depicted at FIG. 2. The bill image is actually part of a larger HTML form which contains information which cannot be viewed by the client. The larger HTML form is presented in FIG. 3 where it can be seen that the actual invoice information (the position of which is shown generally at 20) presented to the client comprises only one portion of the form. The hidden information in the form includes a unique biller identification number (VENDORID), a biller invoice number (VENDORSEQ), and a customer account number (PAYEEACCOUNT). As shown in FIG. 2, the client is presented with a payment amount at input field 22 which the client can accept or modify. To affect payment, the payment icon 24 is selected which causes the client computer 18 to send the HTML form to the bill processing server 12. Referring to FIG. 3, it can be seen that the HTML form directs that the transmission be sent to the web site http://secure.telpay.ca/cgi-bin/telpay. The bill processing server then sends a payment confirmation screen as depicted in FIG. 4 to the client. The client is then prompted to enter an authorization code in field 26, to confirm the client's identity. The client then confirms payment by selecting the "Yes" icon 28. Upon receipt of the client's confirmation message, the bill processing server 12 debits the client's account by contacting a selected one of the financial institution servers 16 and credits the biller's account by contacting a selected one of the financial institution servers 16. Alternately, bill processing server 12 transmits transaction information to clearing house 11 which facilitates the debiting and crediting activities. In either case, when the debit and credit activity is complete, both client computer 18 and biller servers 14 are notified by bill processing server 12 that the payment has been processed.

In a second aspect of the present invention, biller servers 14 send bill information using e-mail to client computer 18. The client then opens the e-mail and is presented with a bill images containing all of the pertinent information relating to the invoice period as described above. It is important to note that for versions of e-mail which do not support a direct representation of HTML, the document is sent as an attachment. The remainder of the steps as described above are then performed. It should also be noted that regardless of how the bill is presented to the client by the biller (i.e. web site or e-mail), marketing materials can be embedded in the bill image to allow the biller to promote additional products and/or services. For example, if the biller was a cable company, a hypertext link could be used to link the client to another page on bill server 16 containing a list of additional channels which could be purchased by the client.

Figure 5:
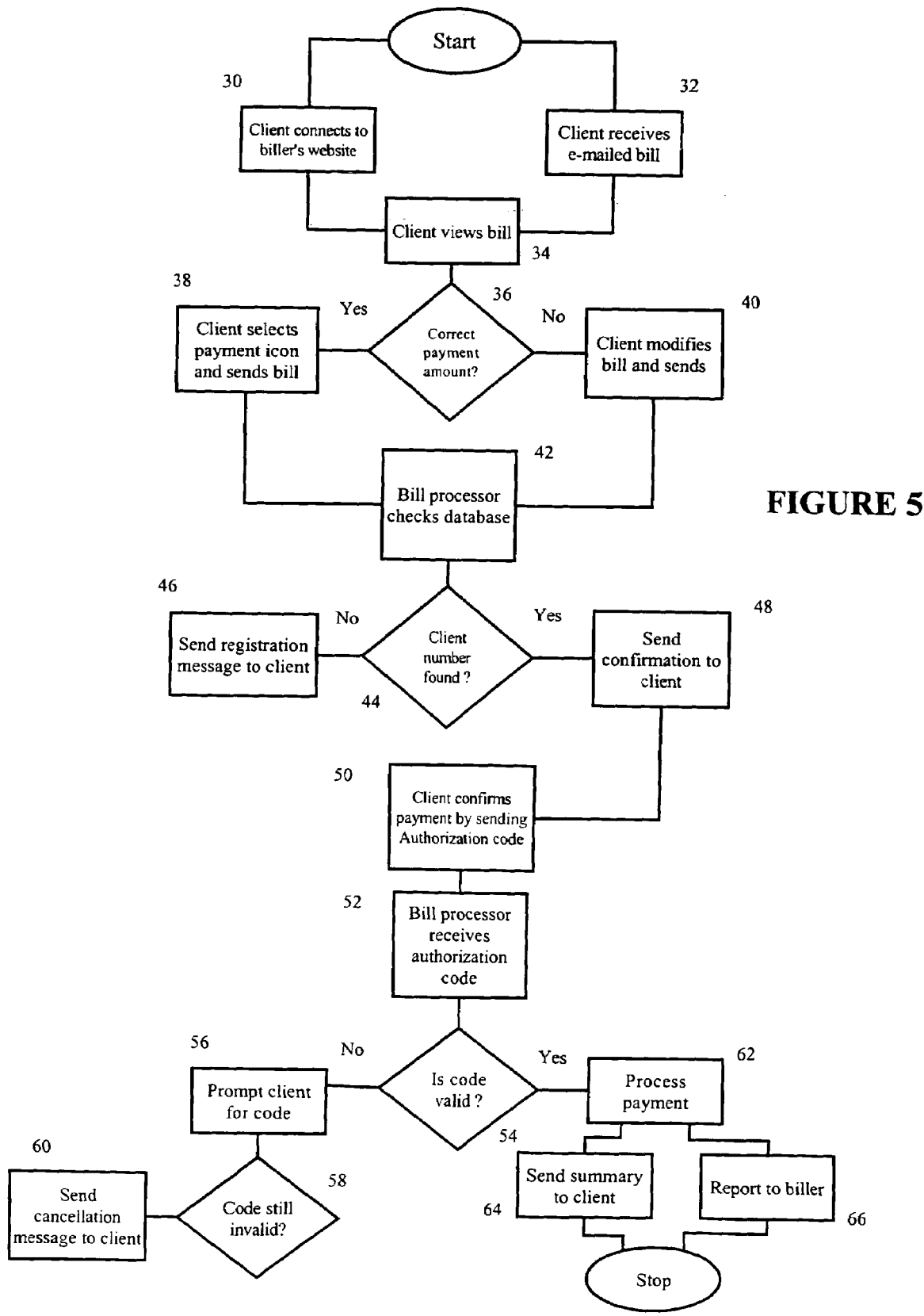
FIG. 5 is a flow chart depicting the steps in the method of the present invention.

Referring to FIG. 5, a process flowchart depicting the method of the present invention is provided. At step 30 the process begins with a client working at client computer 18 which has the capability of connecting to the Internet and operating a Web browser such as Netscape Navigator™. The client connects to the Internet through their ISP and subsequently connects to the web site of a selected on of the biller servers 14. After entering their account number a biller's invoice is presented to the client. Alternately, as depicted at step 32, the process begins with the client working at client computer 18 which has the capability of connecting to the Internet and operating an e-mail program such as Microsoft Outlook™ and which is also capable of operating a web browser. The client connects to the Internet and opens their e-mail account which contains unpaid bills. The client then opens their bill.

Whether the step 30 or step 32 process is used, the end result is the same—the client views a bill image contained within an HTML form in accordance with step 34. In both cases, the bill image contains a payment icon 24. At step 36, the client decides if the payment amount entered into input field 22, is correct. If it is correct, then at step 38 the client selects the payment icon 24 which causes client computer 18 to connect to bill processing server 12 and transmit the HTML form to bill processing server 12. If the payment amount is incorrect, then at step 40 the client modifies the entry and then selects payment icon 24 which causes client computer 18 to connect to bill processing server 12 and transmit the HTML form in secure mode to bill processing server 12. At step 42, the bill processing server 12 accesses its payee translation database to determine the unique account number assigned by the bill processing server 12 to the client. The bill processing server 12 contains a cross-reference database which allows the server to correlate the client's customer number assigned from a biller, to the bill processing system's unique account number. The cross-reference database serves to minimize the amount of information which a biller must provide i.e. only the client's customer number assigned from a biller and the payment amount are required. At step 44, a determination is made regarding the client's unique account number. If it cannot be found in the payee translation database, then at step 46 a message is sent to the client to register with the bill payment system. This typically requires the completion of an application and the provision of a voided cheque to the bill processing organization, so that a client account and an associated financial institution account to be debited, can be established. If the unique account number can be found, then at step 48, bill processing server 12 constructs and sends the payment confirmation HTML message in secure mode to the browser of client computer 18. The returned information also contains session information unique to the client. At step 50, the client views the payment confirmation HTML message and confirms payment by entering their authorization code, and sending the confirmation in secure mode to bill processing server 12 along with session information. At step 52, bill processing server 12 receives the authorization code and at step 54 determines if the code is valid. If the code is not valid, the client is prompted to re-enter the authorization code at step 56. If the code entered is reviewed at step 58 and still found to be invalid then at step 60 a cancellation message is sent from bill processing server 12, to client computer 18. If the authorization code is valid, then at step 62 the payment is processed i.e. the payment received from the client is released into the financial system where client and biller accounts are debited and credited respectively. The debiting and crediting activities can be accomplished via direct transmission to the financial institution servers 16 or through transmission to clearing house 11 which performs the debiting and crediting activities on behalf of the bill processing server 12. At step 64, bill processing server 12 creates a HTML summary message of the transaction and transfers the summary in secure mode to the browser of client computer 18. At defined intervals (e.g. each day) the biller is notified of the payments made by clients and the amount credited to their account as depicted at step 66. A summary of payments made and the amount credited to their account is transmitted by way of file transfer or electronic data interchange (EDI), depending on the sophistication of the client.

The transmissions between client computer 18 and bill processing server 12 are secure HTML messages which use SSL 128 bit encryption (i.e. SHTML). As understood by those in the art, SSL stands for Secure Sockets Layer. The "sockets" of the term refers to the sockets method of passing data back and forth between a client and a server program in a network. SSL is a method for hiding the information a web browser and a web server send to each other including credit card numbers, personal data, or other confidential information. An SSL-enhanced browser such as Netscape™ uses encryption to scramble the data sent to a web site into an unintelligible string of seemingly random characters. A typical transaction is a browser sending the contents of an HTML form to the server. For example, the form used in the present invention has a field named "VENDORID" to hold biller's unique identification number. If the form is sent in an unsecure mode the client's browser would send VENDORID=12345 and the server would receive VENDORID=12345 and give this information to the common gateway interface (CGI) script that handles this form (as indicated earlier, CGI scripts are programs that run remotely on a web server). If the form is sent in a secure mode the client's browser would take VENDORID=12345 and encrypt it so it looked like "e$$%01j*&*(#foij" for example, which would be converted back to VENDORID=12345 when it was received by the server before it was handed to the CGI script that handles the form i.e. the client and the CGI script never see the encrypted form of the unique identifier. SSL uses an algorithm involving "public" and "private" digital keys. The server gives the browser its public key, which the browser uses to encrypt all transmissions. Although the public key is used to encrypt the transmission, it cannot be used to decrypt it. The server uses the private key (which is never sent to anyone) to decrypt the transmissions. Likewise, the browser creates its own public/private key pair for information flowing in the other direction. Therefore even if someone intercepts the transmission, they cannot readily make any sense of it, even if they have the public key.

In addition, SSL is structured to use "digital certificates" of identity to authenticate web sites and web surfers. The certificate contains the certificate holder's name, a serial number, expiration dates, and a copy of the certificate holder's public key. Each certificate is "digitally signed" and issued by a trusted third party such as Thawte™ or VeriSign™. Such trusted third parties are known as "Certification Authorities" (CA). Once a web site has registered with a CA, the digital certificate is kept in a registry so that authenticated users can look up other users' public key.

It is preferable that a client use an SSL-enhanced browser although it is not essential to the invention. The use of such a browser serves to increase transmission security, so that client's authorization code for accessing bill processing server 12 is not compromised. Additionally, if the billers are registered with a certification authority, then the bill payment can be accomplished using a single "click" i.e. the bill processing server would be assured that the HTML form originated from the biller server 14, so additional verification by the client would not be required. Additionally, if the client was certified (through a personal certificate), then the bill processing server 12 could be assured that the client is the entity transmitting the HTML form, so that an authorization code would not have to be entered for verification of the sender.

It should be understood that the HTML form described above is a tool which can be used by billers to present bill information and embedded bill payment instructions to clients to facilitate easy payment of bills. Once a biller and a client have independently established a relationship with the bill processing organization, the biller can take advantage of the HTML form for bill presentment. If the client has not established a relationship with the bill processing organization, then a viewed bill can simply be paid in a manner as described in the prior art. However, if fully automated payment of bills is desired as described in the present invention, both biller and client must establish a relationship with the bill processing organization. Additionally, if a client desires that certain bills be paid from a first bank account and other bills be paid from a second bank account, the bank account to be debited for specified billers must be provided to the bill processing organization who will store this information in the bill processing serving 12.

The advantages of the present invention are now readily apparent. The system for the payment of bills described above is fully automated, requiring no paper to be exchanged between biller, financial institutions and clients. As well, the biller is not required to upload confidential billing data to a third party bill presentment organization. Only a minimal amount of information needs to be received by bill processing server 12 to facilitate bill payment. Further, whether the client has logged into a biller's web site or opened a e-mail at their desktop, payment can be facilitated with minimal client interaction. Additionally, all transmissions between the client's computer and the bill processing server are secure to ensure that a client's authorization code is not compromised. Finally, by allowing the biller to present the bill, value added marketing materials and links can be provided to the client.

A person skilled in the art may now conceive of alternate structures and embodiments or variations of the above. All those which fall within the scope of the claims appended hereto are considered to be part of the present invention.

The embodiments of the invention in which an exclusive property or privilege are claimed are defined as follows:

1. A system for the automated payment of bills comprising:
    (a) a bill processing server connected to a network,
    (b) one or more financial institution servers connected to said network, wherein a client has at least one banking account associated with at least one of said one or more financial institution servers and a biller has at least one banking account associated with at least one of said one or more financial institution servers;

(c) one or more biller servers connected to said network, wherein said client has at least one billing account associated with at least one of said one or more biller servers;

(d) at least one client computer connected to said network;

wherein said one or more biller servers includes means to format bill information and bill payment instructions associated with said at least one billing account;

and wherein said bill information further includes means for initiating bill payment instructions;

and wherein said at least one client computer comprises a processor, communication means, a server access program and a display for receiving and viewing from said one or more biller servers and not said bill processing server said bill information, and input means for selecting said means for initiating bill payment instructions;

and wherein said processor integral to said at least one client computer is responsive to said input means and causes said communication means to communicate said bill payment instructions to said bill processing server when said means for initiating bill payment instruction is selected;

and wherein said bill processing server causes a selected one of said at least one client banking account to be debited and a selected one of said at least one biller banking account to be credited, upon receipt of said bill payment instructions;

and wherein said bill processing server reports to a selected one of said one or more biller servers a selected one of said at least one billing account associated with said biller and a credit amount;

and wherein said bill processing server reports to a selected one of said at least one client computer a selected one of said at least one billing account associated with said client and a debit amount.

2. The system of claim 1 further including a database integral to said bill processing server for correlating said at least one client billing account stored in said bill payment instructions with a unique alphanumeric identifier assigned to said client and stored in said bill processing server, wherein said client is identified by said bill processing server when said bill payment instructions are received by said bill processing server and wherein a confirmation message is sent to said client upon identification of said client, and wherein said client confirms said bill payment instructions prior to said bill processing server debiting and crediting said client and biller banking accounts respectively.

3. The system of claim 1 wherein information identifying said client and said biller banking accounts are stored in said bill processing server.

4. The system of claim 1 wherein said bill information is a bill image presentable to said client and said means for formatting said bill information and said bill payment instructions is an HTML form.

5. The system of claim 4 wherein said network is the World Wide Web and said server access program is a web browser.

6. The system of claim 5 wherein said HTML form is loaded into a selected one of said at least one client computer from a selected one of said one or more biller servers upon request by said client.

7. The system of claim 4 wherein said HTML form is contained in an e-mail forwarded by one of said one or more biller servers to a selected one of said at least one client computer.

8. The system of claim 1 wherein said means for initiating bill payment instructions is an icon.

9. The system of claim 4 wherein the billing image further includes a biller name, a billing account number, an invoice number, an invoice period, details of activity during said invoice period, and a total amount owed for the invoice period.

10. The system of claim 4 wherein said billing image further includes marketing banners and marketing hypertext links to information stored on said one or more biller servers.

11. The system of claim 1 wherein said bill payment instructions include a payment amount, a billing account number, an invoice number and a biller identification number.

12. The system of claim 1 wherein said at least one client computer is a workstation, laptop, or wireless personal digital assistant.

13. The system of claim 1 wherein communication between said at least one client computer and said bill processing server is in an HTML form using SSL 128 bit encryption.

14. A method of viewing and paying bills over a communications network, said communications network comprising: a bill processing server connected to a network, one or more financial institution servers connected to said network, wherein a client has at least one banking account associated with at least one of said one or more financial institution servers and a biller has at least one banking account associated with at least one of said one or more financial institution servers; one or more biller servers connected to said network, wherein said client has at least one billing account associated with at least one of said one or more biller servers; and at least one client computer connected to said network, the method comprising the steps of:

(a) formatting at a selected one of said one or more biller servers bill information and bill payment instructions associated with a selected one of said at least one billing account, wherein said bill information includes means for initiating bill payment instructions;

(b) transmitting said bill information and said bill payment instructions from a selected one of said one or more biller servers and not said bill processing server to a selected one of said at least one client computer;

(c) receiving and displaying said bill information on said selected one of said at least one client computer, wherein said selected one of said at least one client computer comprises a processor, communication means, a server access program and a display for receiving and displaying said bill information, and input means for selecting said means for initiating bill payment instructions;

(d) selecting said means for initiating bill payment instructions;

(e) transmitting said bill payment instructions from said selected one of said at least one client computer to said bill processing server;

(f) receiving said bill payment instructions into said bill processing server;

(g) debiting a selected one of said at least one client banking account;

(h) crediting a selected one of said at least one biller banking account;

(i) reporting said selected one of said at least one billing account and a credit amount to said selected one of said one or more biller servers; and (j) reporting said selected one of said at least one billing account and a debit amount to said selected one of said at least one client computer.

15. The method of claim 14 further including the steps of:
(a) identifying said client by correlating said at least one client billing account stored in said bill payment instructions with a unique alphanumeric identifier assigned to said client and stored in said bill processing server;
(b) sending a confirmation message to said client upon identification of said client; and
(c) confirming said bill payment instructions prior to said bill processing server debiting and crediting said client and biller banking accounts respectively.

16. The method of claim 14 wherein information identifying said client and said biller banking accounts are stored in said bill processing server.

17. The method of claim 14 wherein said bill information is a bill image presentable to said client and said means for formatting said bill information and said bill payment instructions is an HTML form.

18. The method of claim 17 wherein said network is the World Wide Web and said server access program is a web browser.

19. The method of claim 18 wherein said HTML form is loaded into a selected one of said at least one client computer from a selected one of said one or more biller servers upon request by said client.

20. The method of claim 17 wherein said HTML form is contained in an e-mail forwarded by one of said one or more biller servers to a selected one of said at least one client computer.

21. The method of claim 14 wherein said means to communicate bill payment instructions is an icon.

22. The method of claim 17 wherein the billing image further includes a biller name, a billing account number, an invoice number, an invoice period, details of activity during said invoice period, and a total amount owed for the invoice period.

23. The method of claim 17 wherein said billing image further includes marketing banners and marketing hypertext links to information stored on said one or more biller servers.

24. The method of claim 14 wherein said bill payment instructions include a payment amount, a billing account number, an invoice number and a biller identification number.

25. The method of claim 14 wherein said at least one client computer is a workstation, laptop, or wireless personal digital assistant.

26. The method of claim 14 wherein communication between said at least one client computer and said bill processing server is in an HTML form using SSL 128 bit encryption.

* * * * *